T. J. FEGLEY & G. O. LEOPOLD.
DRILL.
APPLICATION FILED DEC. 12, 1913.
1,103,746.   Patented July 14, 1914.
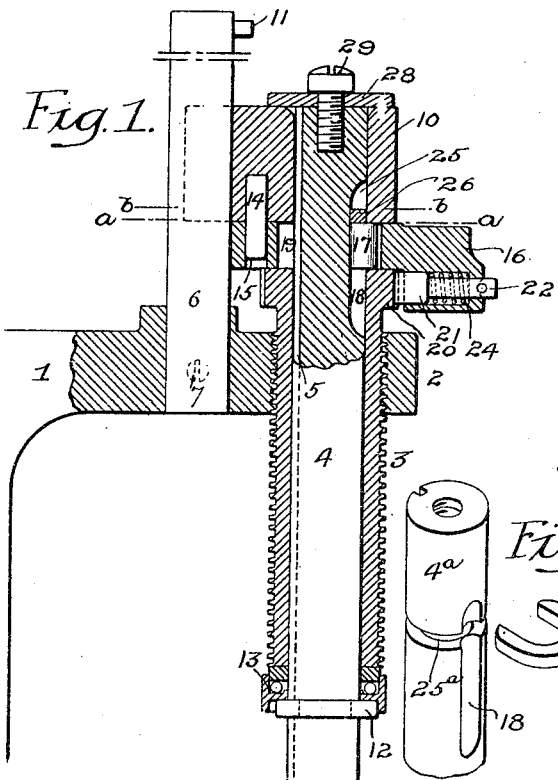
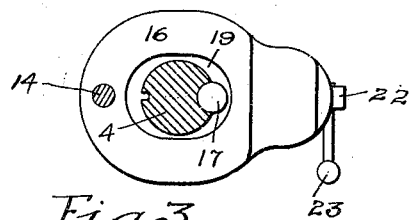
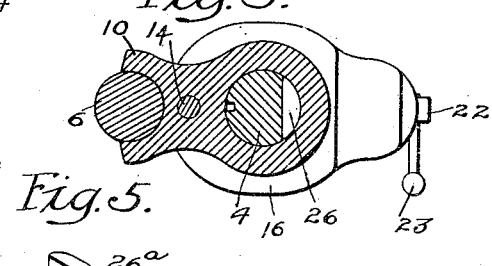
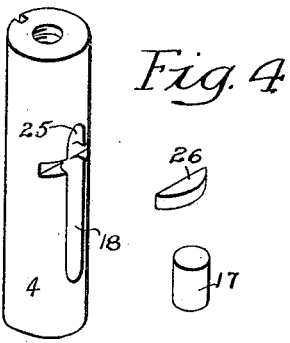
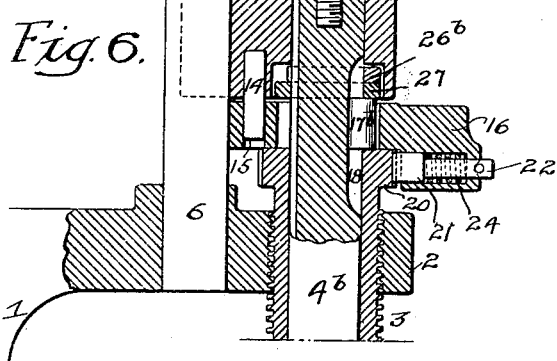
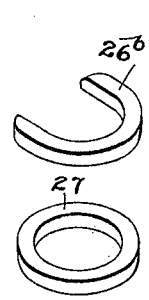
Witnesses:
Walter Chism
William T. Nase
Inventors:
Thomas J. Fegley
George O. Leopold
by their Attorneys
Howson & Howson

UNITED STATES PATENT OFFICE.

THOMAS J. FEGLEY AND GEORGE O. LEOPOLD, OF PHILADELPHIA, PENNSYLVANIA, ASSIGNORS TO NORTH BRO'S. M'F'G. CO., OF PHILADELPHIA, PENNSYLVANIA, A CORPORATION OF PENNSYLVANIA.

DRILL.

1,103,746.  Specification of Letters Patent.  Patented July 14, 1914.

Application filed December 12, 1913. Serial No. 806,266.

*To all whom it may concern:*

Be it known that we, THOMAS J. FEGLEY and GEORGE O. LEOPOLD, citizens of the United States, residing in Philadelphia, county of Philadelphia, State of Pennsylvania, have invented certain Improvements in Drills, of which the following is a specification.

Our invention relates to certain improvements in drilling machines, particularly of the type known as "bench drills" in which the drill frame can be secured to a bench and the mechansim operated by hand, but it will be understood that the mechanism can be operated by power if desired.

The object of the present invention is to provide means for relieving the guide block from pressure at the upper end of the drill spindle and to provide means for holding the roller and the feed screw in the proper position, yet allowing both to turn freely independently of the spindle.

In the accompanying drawings: Figure 1 is a vertical sectional view of sufficient of the upper portion of a drilling machine to illustrate our invention; Fig. 2 is a sectional plan view on the line *a—a*, Fig. 1; Fig. 3 is a sectional plan view on the line *b—b*, Fig. 1; Fig. 4 is a perspective view of a portion of the spindle, the roller, and the segment; Fig. 5 is a view illustrating a modification of the form of segment; Fig. 6 is a sectional view illustrating another modification; and Fig. 7 is a perspective view showing the segment and collar illustrated in Fig. 6.

Referring to the drawings, 1 is the frame of the drill having an upper bearing 2. In this bearing is a screw threaded opening through which passes a feed screw 3, mounted on the spindle 4 of the drill. The spindle may be driven by any suitable gearing, either connected to a handled shaft or to one driven by power. In the present instance, the spindle has a spline 5 extending throughout its length into which extends a key on the driving mechanism so that the spindle is free to move longitudinally in the driving mechanism but must turn therewith.

Mounted on the frame 1 is a guide rod 6 which is rigidly held to the frame by a screw 7, or other suitable fastening. The rod acts as a guide for the block 10, and this block is forked to extend on each side of the rod 6, as illustrated in Fig. 3. The spindle 4 acts as the other guide to hold the block rigidly in position, yet allows it to slide vertically with the spindle on the rod. The bearing 2 limits the movement of the spindle in one direction and the stop 11 on the rod 6 limits the movement of the spindle in the opposite direction. Automatic stops, however, may be used, if desired, as the stops form no part of the present invention.

The spindle 4 is grooved to receive an abutment collar 12 and between this abutment collar and the end of the feed screw 3 is a ball bearing 13, which takes the thrust when the drill is passing through the work. Projecting from the head 10 is a pin 14, which enters an opening 15 in a reciprocating carrier 16. This pin acts as a pivot for said carrier and lateral motion is imparted to the carrier by a roller 17, in the present instance, mounted in the longitudinal slot 18 in the spindle 4. The carrier has an opening 19 of sufficient size to allow the spindle carrying the roller to rotate and to vibrate the carrier. On the upper end of the feed screw is a ratchet wheel 20 with which engages a pawl 21 having a spindle 22 and on this spindle is an arm 23 adapted to a notch in the carrier 16. A spring 24 is located between the pawl and the inner end of the socket, in which the pawl is mounted, which tends to force the pawl into engagement with the ratchet teeth on the feed screw. The pawl can be turned so as to ratchet either to the right or to the left, or it can be turned to the mid position and the arm 23 will travel on the cam formed by the slot and will lift the pawl out of engagement with the teeth. The pawl will be held out of engagement until it is turned to one of its two positions mentioned above. We lay no claim to this particular feature of the invention.

Located in a transverse slot 25 directly above the roller 17 is a segment 26 and the upper end of the roller 17 rests against this segment, applying the strain directly to the segment instead of to the head 10. Secured to the end of the spindle 4 is a washer 28 which overlaps the head 10 and this washer is secured to the spindle by a screw 29. In some instances, the segment may be made as shown at 26ª, Fig. 5, adapted to an annular slot 25ª in the spindle 4ª, or the construction illustrated in Figs. 6 and 7 may be used. In this instance, a segment 26ᵇ is located in a slot in the spindle 4ᵇ and a ring 27 is located on the spindle between the segment and the roller 17ᵇ. This roller is of a greater length than the roller illustrated in Fig. 1, so that the roller will be held between the end of the feed screw and the ring 27, leaving the head 10ᵇ free. The roller 17ᵇ can rotate in the slot 18, but it is not necessary as it merely acts as a cam to reciprocate the carrier and, in the present case, acts as a medium to transmit the end pressure of the feed screw to the spindle through the segment.

We claim:

1. The combination in a drill, of a frame; a spindle; the frame having a threaded opening; a feed screw mounted on the spindle and adapted to the threaded opening; a ratchet wheel on the feed screw; a vibrating carrier having a pawl arranged to engage the ratchet wheel, the spindle having a longitudinal slot therein; a roller mounted in the slot and arranged to actuate the carrier; a segment carried by the spindle and extending over the roller holding the feed screw from moving in one direction on the spindle; and a bearing on the spindle holding the feed screw in the opposite direction.

2. The combination in a drill, of a frame; a spindle; means for turning the spindle; a feed screw mounted on the spindle; a frame having a threaded opening for the feed screw; a collar on the spindle against which the lower end of the feed screw rests, said spindle having a slot; a roller in the slot; a segment mounted on the spindle and resting on the roller; the feed screw being held between the segment and the collar, said feed screw having a ratchet wheel; a block mounted on the spindle; a carrier pivoted to the block and having a pawl engaging the ratchet teeth of the feed screw and having an opening for the passage of the spindle, the roller acting to vibrate the carrier as the spindle rotates.

3. The combination of a slotted spindle; a feed screw having a ratchet wheel; a block on the spindle; a carrier pivoted to the block and having a pawl engaging the ratchet wheel and having an opening through which the spindle extends; a roller located in the slot of the spindle and extending through the opening in the carrier, said roller being of a greater length than the height of the carrier; and an abutment carried by the spindle against which the end of the roller rests so as to allow the carrier to move freely between the block and the feed screw.

In testimony whereof, we have signed our names to this specification, in the presence of two subscribing witnesses.

THOMAS J. FEGLEY.
GEORGE O. LEOPOLD.

Witnesses:
Jos. H. KLEIN,
WM. A. BARR.

---

Copies of this patent may be obtained for five cents each, by addressing the "Commissioner of Patents, Washington, D. C."